United States Patent
Jeon et al.

(10) Patent No.: US 11,625,295 B2
(45) Date of Patent: Apr. 11, 2023

(54) OPERATING MEMORY DEVICE IN PERFORMANCE MODE

(71) Applicant: Micron Technology, Inc., Boise, ID (US)

(72) Inventors: Seungjune Jeon, Santa Clara, CA (US); Zhenming Zhou, San Jose, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/302,676

(22) Filed: May 10, 2021

(65) Prior Publication Data
US 2022/0358009 A1 Nov. 10, 2022

(51) Int. Cl.
*G06F 11/10* (2006.01)
*G06F 11/30* (2006.01)
*G06F 11/14* (2006.01)

(52) U.S. Cl.
CPC ........ *G06F 11/1068* (2013.01); *G06F 11/106* (2013.01); *G06F 11/1435* (2013.01); *G06F 11/3037* (2013.01)

(58) Field of Classification Search
CPC ............... G06F 11/1068; G06F 11/106; G06F 11/3037; G06F 11/1435
See application file for complete search history.

(56) References Cited

U.S. PATENT DOCUMENTS

| | | | |
|---|---|---|---|
| 5,590,309 A * | 12/1996 | Chencinski | G06F 12/0875 711/140 |
| 8,726,129 B1 | 5/2014 | Aguilera et al. | |
| 10,990,474 B1 * | 4/2021 | Bent | G06F 11/3034 |
| 11,036,596 B1 * | 6/2021 | Coleman | G06F 11/3006 |
| 2003/0191888 A1 * | 10/2003 | Klein | G11C 11/4076 711/105 |
| 2005/0060603 A1 * | 3/2005 | Pomaranski | G06F 11/106 714/6.32 |
| 2005/0091452 A1 | 4/2005 | Chen et al. | |
| 2006/0218203 A1 | 9/2006 | Yamato et al. | |
| 2008/0183963 A1 * | 7/2008 | He | G06F 11/1092 711/E12.001 |
| 2012/0192037 A1 * | 7/2012 | Gibson | G06F 11/1076 714/E11.034 |
| 2015/0006998 A1 * | 1/2015 | Cordero | G06F 11/106 714/773 |
| 2017/0010628 A1 * | 1/2017 | Byers | G06F 9/46 |
| 2017/0060681 A1 * | 3/2017 | Halbert | H03M 13/6566 |
| 2018/0129430 A1 * | 5/2018 | Kang | H03M 13/2757 |

(Continued)

OTHER PUBLICATIONS

Leila Namvari-Tazehkand et al., 'Investigating the Reliability in Three RAID Storage Models and Effect of Ordering Replicas on Disks', arXiv:2104.01238, pp. 1-7, Apr. 2021 [retrieved on Jul. 29, 2022]. Retrieved from <URL: https://arxiv.org/abs/2104.01238>.

(Continued)

*Primary Examiner* — Guy J Lamarre
(74) *Attorney, Agent, or Firm* — Lowenstein Sandler LLP (57) ABSTRACT

A memory device is set to a performance mode. Data item is received. The data item in a page of a logical unit of the memory device associated with a fault tolerant stripe is stored. A redundancy metadata update for the fault tolerant stripe is delayed until a subsequent media management operation.

20 Claims, 5 Drawing Sheets

(56) References Cited

U.S. PATENT DOCUMENTS

| | | |
|---|---|---|
| 2019/0121703 A1 | 4/2019 | Scott |
| 2020/0117534 A1* | 4/2020 | Yurzola ................. G06F 3/0619 |
| 2022/0011967 A1* | 1/2022 | Mekhanik .............. G11C 29/38 |

OTHER PUBLICATIONS

PCT International Search Report and Written Opinion for International Application No. PCT/US2022/028392 dated Aug. 22, 2022, 11 pages.

* cited by examiner

FIG. 1

| Address | MU0 | MU1 | MU2 | MU3 | MU4 | MU5 | MU6 | MU7 | MU8 | MU9 | MU10 | XOR Parity | Valid Flag |
|---|---|---|---|---|---|---|---|---|---|---|---|---|---|
| 1 | | | | | | | | | | | | | |
| 2 | | | | | | | | | | | | | |
| 3 | | | | | | | | | | | | | |
| 4 | | | | | | | | | | | | | |
| 5 | | | | | | | | | | | | | |
| 6 | | | | | | | | | | | | | |
| 7 | | | | | | | | | | | | | |
| 8 | | | | | | | | | | | | | |
| 9 | | | | | | | | | | | | | |
| 10 | | | | | | | | | | | | | |
| 11 | | | | | | | | | | | | | |

OPERATING MEMORY DEVICE IN PERFORMANCE MODE

TECHNICAL FIELD

Embodiments of the disclosure relate generally to memory sub-systems, and more specifically, relate to a memory device performance mode to improve random write performance.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to a memory device performance mode to improve random write performance. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device, which is a package of one or more dice. The dice in the packages can be assigned to one or more channels for communicating with a memory sub-system controller. The non-volatile memory devices include cells (i.e., electronic circuits that store information), that are grouped into pages to store bits of data. One example of non-volatile memory devices is a negative-and (NAND) memory device. Other examples of non-volatile memory devices are described below in conjunction with FIG. 1.

Various memory sub-systems can implement fault tolerant redundancy schemes, such as a redundant array of independent NAND (RAIN), for error checking and correction. A fault tolerant redundancy scheme can store data item in groups of pages, referred herein as fault tolerant stripes, such that each stripe includes a redundancy metadata (e.g., a parity page) storing a redundancy metadata (e.g., a XOR parity), thus enabling for the data to be reconstructed if one of the pages of the stripe fails.

In order to maintain the ability to reconstruct the pages of the fault tolerant stripes, the redundancy metadata can be updated concurrently with any write request initiated by the host to change any page of the fault tolerant stripe. In some implementations, a read-modify-write operation can be performed on the fault tolerant stripe. Accordingly, to write data item to the memory device, data is read from the page where the data item is to be written as well as the redundancy metadata associated with the fault tolerant stripe to ensure reconstruction of the pages of the fault tolerant stripe (i.e., the read portion of a read-modify-write operation). Once the data is read from the fault tolerant stripe, the memory sub-system modifies the data read during the read portion of the read-modify-write operation (e.g., the page where the data item is to be written and the redundancy metadata) with the data item to be written and an updated redundancy metadata (i.e., the modify portion of a read-modify-write operation). After modification of the read data, the memory sub-system writes the modified data to the pages that were read during the read portion of the read-modify-write operation (i.e., the write portion of a read-modify-write operation). Thus, with each host write request of a single page, the memory sub-system would need to perform at least two physical reads and two physical writes. This can cause considerable performance degradation compared to memory sub-systems that do not guarantee failure protection with redundancy metadata.

In some implementations, memory sub-systems can reduce read-modify-write operations by utilizing write cache to consolidate the host write request into a full or partial stripe writes. A memory sub-system can implement a staging memory (e.g., cache memory) between the host and the memory device. However, cache-based solutions would only marginally reduce the read-modify-write overhead.

Aspects of the present disclosure address the above and other deficiencies by allowing the data items to be written to the memory device without updating the redundancy metadata, which would only be updated following a subsequent media management operation (such as wear leveling operation and write scrub operation). The media management operations can be performed by the memory sub-system controller periodically in the background mode at a predetermined time period.

Advantages of the present disclosure include, but are not limited to, drastically reducing random write performance of the memory device by limiting the update and storing of the redundancy metadata s to the period of times where media management operations are performed.

Figure 1:
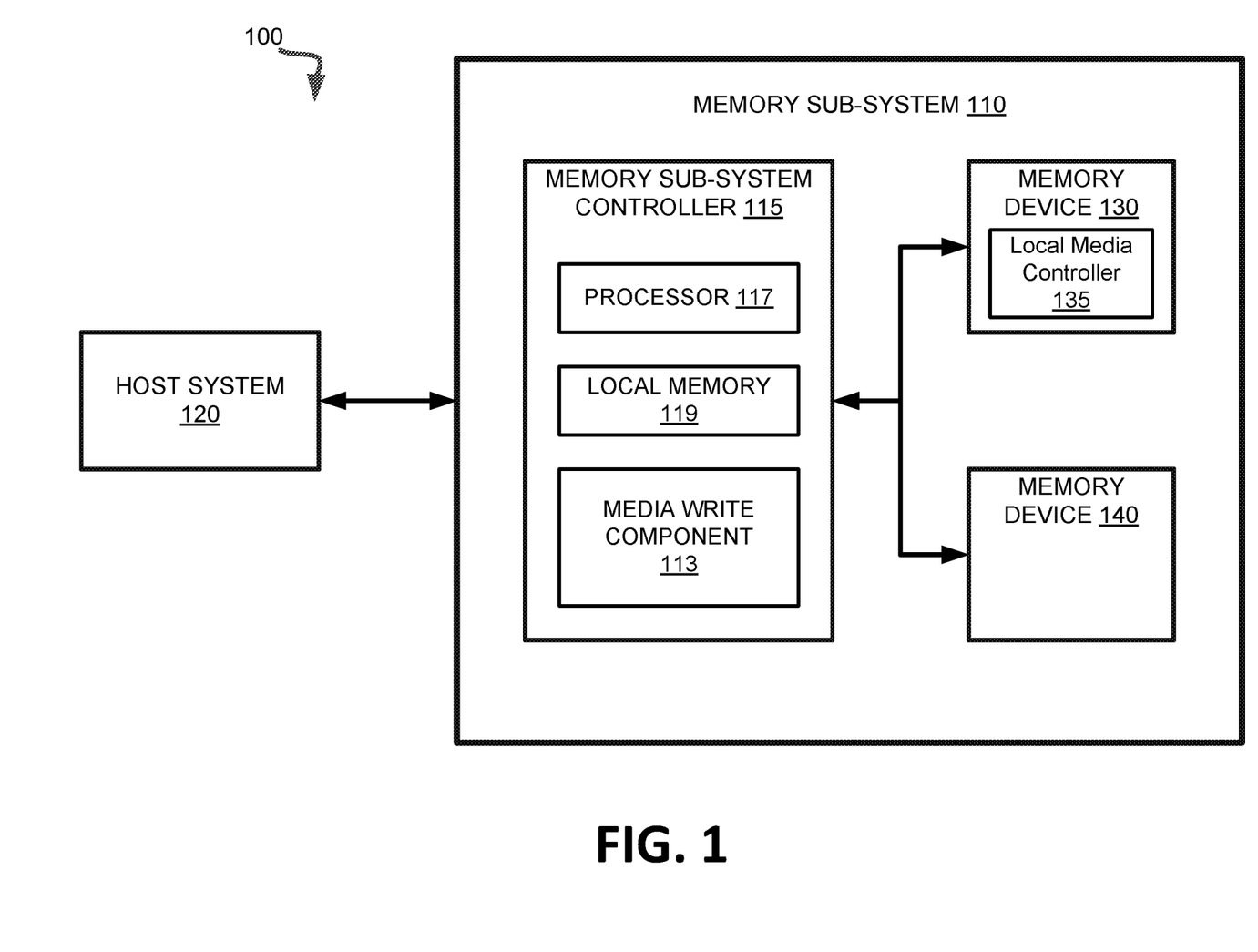
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a media write component 113 that can, depending upon a chosen mode of operation, either perform read-modify-write operations or, if the performance mode is selected, delay the redundancy metadata updates until a subsequent media management operations following the write operation is performed on the memory device 130, 140. In some embodiments, the memory sub-system controller 115 includes at least a portion of the media write component 113. In some embodiments, the media write component 113 is part of the host system 110, an application, or an operating system. In other embodiments, local media controller 135 includes at least a portion of media write component 113 and is configured to perform the functionality described herein.

The media write component 113, based on receiving a mode selection to place the memory device 130, 140 into performance mode, can set the memory sub-system to performance mode. To set the memory device 130, 140 to performance mode, the memory device 130, 140 can maintain a performance mode flag (e.g., a bit flag), which can be stored, e.g., in a metadata table of the memory device 130, 140. The flag would be set (e.g., to the logical "1") to indicate that the memory device 130, 140 is in a performance mode, and would be cleared (e.g., to the logical "0") to indicate that the memory device 130, 140 is not in a performance mode. Once the performance mode is set, the redundancy metadata for each fault tolerant stripe would not be updated with each write request associated with the fault tolerant stripe but rather the redundancy metadata update would be delayed until a subsequent media management operation following the write operation is performed on the memory device 130, 140. The controller can perform media management operations on the memory device 130, 140 at a predetermined period of time (e.g., every 3 or 6 hours). Prior to the first media management operation after a memory write operation (e.g., within the first 3 hours or 6 hours after the memory write operation), the reliability of each fault tolerant stripes is exchanged for random write performance.

Media management operations can include write scrub operation and/or wear leveling operation. A write scrub operation can involve reading data from a specified physical location of the memory device, performing error correction, and writing the data back to the same physical location of the memory device. Conversely, a wear leveling operation can involve reading data from a specified physical location of the memory device, performing error correction, and writing the data to another physical location of the memory device.

Based on the delay of the redundancy metadata updates, media write component 113 does not inherently provide an indication as to the validity of the redundancy metadata. Thus, error recovery operations are performed on the fault tolerant stripes regardless of the validity of the redundancy metadata (e.g., whether the redundancy metadata was updated or not). Error recovery operation, initially, attempts to correct the fault tolerant stripe by updating the demarcation voltage (i.e. VDM). Subsequently, if the initial error recovery operation fails, the error recovery operation reads the fault tolerant stripe and uses the redundancy metadata to recover the fault tolerant stripe. For example, if the redundancy metadata is not updated (e.g. invalid redundancy metadata) and the initial error recovery operation was successful the error recovery operation did not need the redundancy metadata. Accordingly, if the initial error recovery operation fails and the subsequent error recovery operation using the redundancy metadata is performed, the success of the subsequent error recovery operation is based on the validity of redundancy metadata (e.g., if the redundancy metadata is invalid recovery of the fault tolerant stripe will fail).

In one embodiment, media management operation may be prioritized based on a valid redundancy metadata flag. The media write component 113 can maintain a valid redundancy metadata flag (e.g., a bit flag), which can be stored, e.g., in the physical-to-logical metadata table. The flag would be set (e.g., to the logical "1") to indicate that the redundancy metadata of a fault tolerant stripe of the memory device has been updated to reflect the latest write operation (and thus is valid), and would be cleared (e.g., to the logical "0") to indicate that the redundancy metadata has not been updated following the latest write operation, and thus can be invalid. Accordingly, the valid redundancy metadata flag can be cleared upon performing a write operation and can be set upon performing a media management operation with respect to the memory device. The media write component 113 can prioritize media operations (e.g., write scrub operation) on fault tolerant stripes with cleared valid redundancy metadata flag (e.g., logical "0") indicating that the fault tolerant stripes have no valid redundancy metadata. In some embodiments, the media write component 113 can implement a first write scrub operation to be performed on data units associated with cleared valid redundancy metadata flag (e.g., logical "0") and a second write scrub operation to be performed on data units associated with set valid redundancy metadata flag (e.g., logical "1") or all data units regardless of the status of the valid redundancy metadata flag. Further details with regards to the operations of the media write component 113 are described below.

Figure 2:
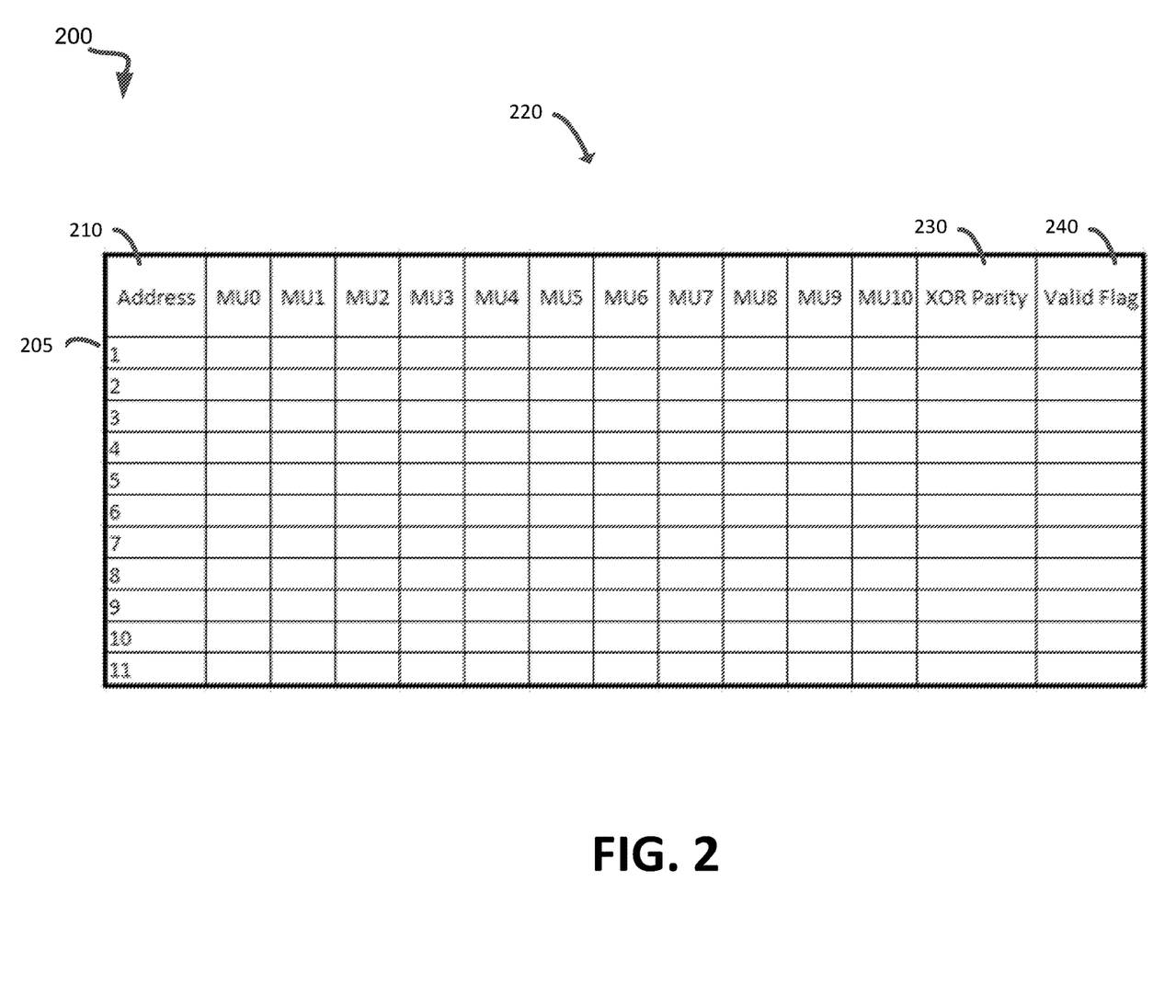
FIG. 2 is an example fault tolerant layout of a memory device in accordance with some embodiments of the present disclosure.

FIG. 2 is an example fault tolerant layout of a memory device. The fault tolerant layout 200 comprises a plurality of fault tolerant stripe 205. Each fault tolerant stripe 205 includes a logical address 210 corresponding to a plurality of data units 220 (also referred to as "MU0-MU10"). Data items can be written to the plurality of data units 220. In some embodiments, the data item can be some internal programming operation initiated by the controller (e.g., a media management operation such as garbage collection, wear leveling, etc.). The fault tolerant stripe 205 further includes a XOR parity 240 (also referred to as "redundancy metadata"). The XOR parity 240 is calculated based on the execution of an XOR operation on the plurality of data units 220 and stored in the respective XOR parity 240 of the fault tolerant stripe 205 (e.g., XOR (MU0, MU1, MU2, MU3, MU4, MU5, MU6, MU7, MU8, MU9, MU10)). In some embodiments, as described previously, each fault tolerant stripe 205 can include a valid flag 240 (e.g., valid redundancy metadata flag). The valid flag 240 can be set (e.g., to the logical "1") to indicate that the XOR parity 230 of the fault tolerant stripe 205 has been updated to reflect the latest write operation to the plurality of data units 220 (and thus is valid), and can be cleared (e.g., to the logical "0") to indicate that the XOR parity 230 of the fault tolerant stripe 205 has not been updated following the latest write operation to the plurality of data units 220, and thus can be invalid.

In some embodiments, the memory device can include a valid flag 240 (e.g., valid redundancy metadata flag). The valid flag 240 can be set (e.g., to logical "1") to indicate that all of the XOR parities 230 of the plurality of fault tolerant stripe 205 of the memory device has been updated to reflect the latest write operations to the plurality of data units 220 of the memory device (and thus all of the data units of the memory device are valid), and can be cleared (e.g., to the logical "0") to indicate that the XOR parities 230 of the memory device has not been updated following the latest write operation to the plurality of data units 220 (and thus at least one of the data units of the memory device is invalid). Accordingly, the valid flag 240 when set indicates that every XOR parity in the memory drive is valid and when cleared the valid flag 240 indicates that at least one of the XOR parity in the memory drive is not valid.

Figure 3:
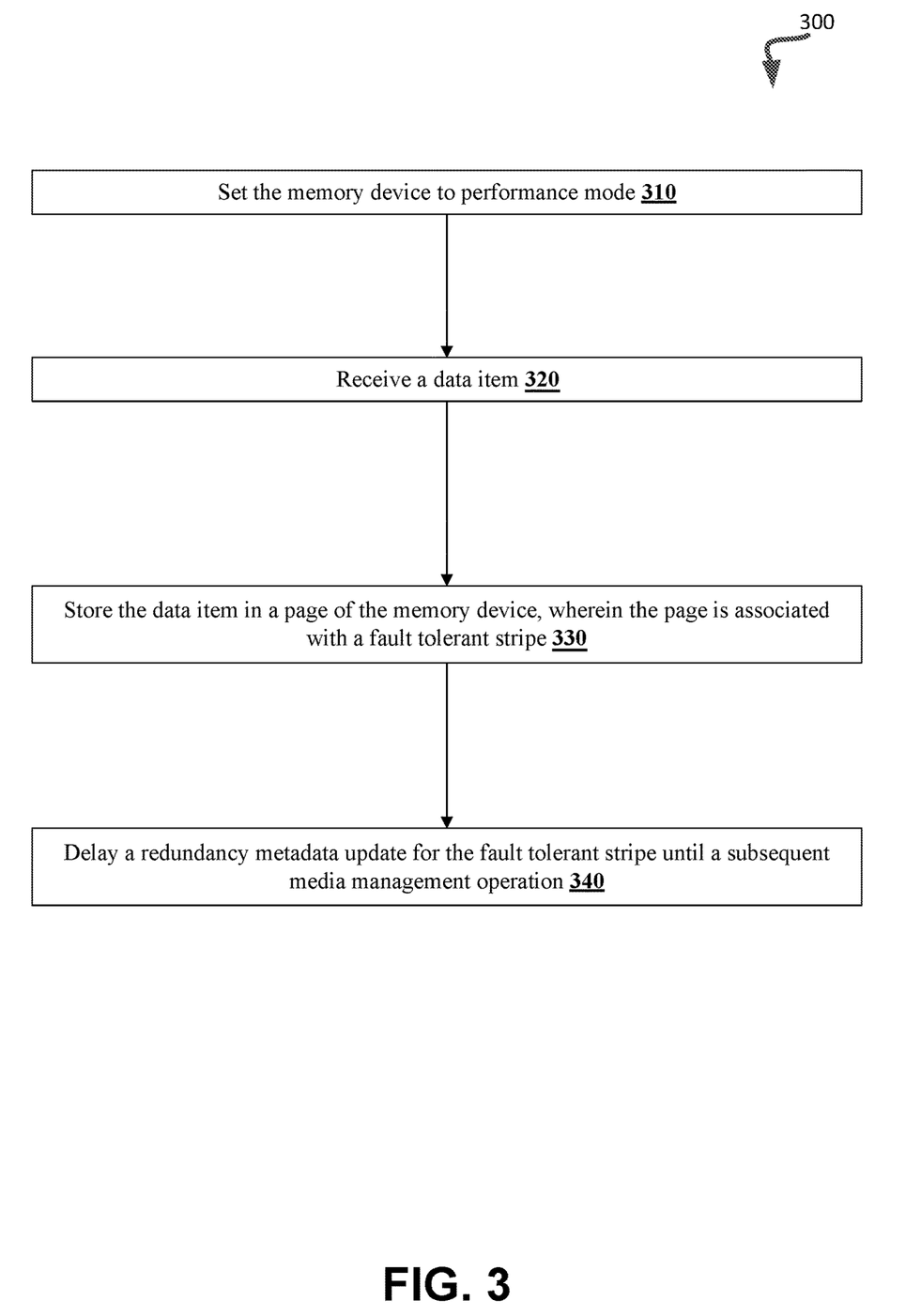
FIG. 3 is a flow diagram of an example method of performing media write operations in accordance with some embodiments of the present disclosure.

FIG. 3 is a flow diagram of an example method 300 of performing media write operations, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the media write component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic sets, based on a performance mode being the chosen mode of operation, the memory device to performance mode. Once the memory device is set to performance mode, the processing logic proceeds to operation 220 to receive data item.

At operation 330, the processing logic stores the data item in a page of logical unit of the memory device associated with a fault tolerant stripe. Once the data item is stored in the page of the logical unit of the memory device associated with the fault tolerant stripe, the processing logic proceeds to operation 340 to delay a redundancy metadata (e.g., XOR parity) update for the fault tolerant stripe until a subsequent media management operation. As described previously, the subsequent media management operation which can be a write scrub operation or wear leveling operation is periodically performed every predetermined time period (e.g., every 3 hours). The predetermined time period that the subsequent media management operation is to be performed is based on the when the previous media management operation was performed or the initialization of the memory device.

Figure 4:
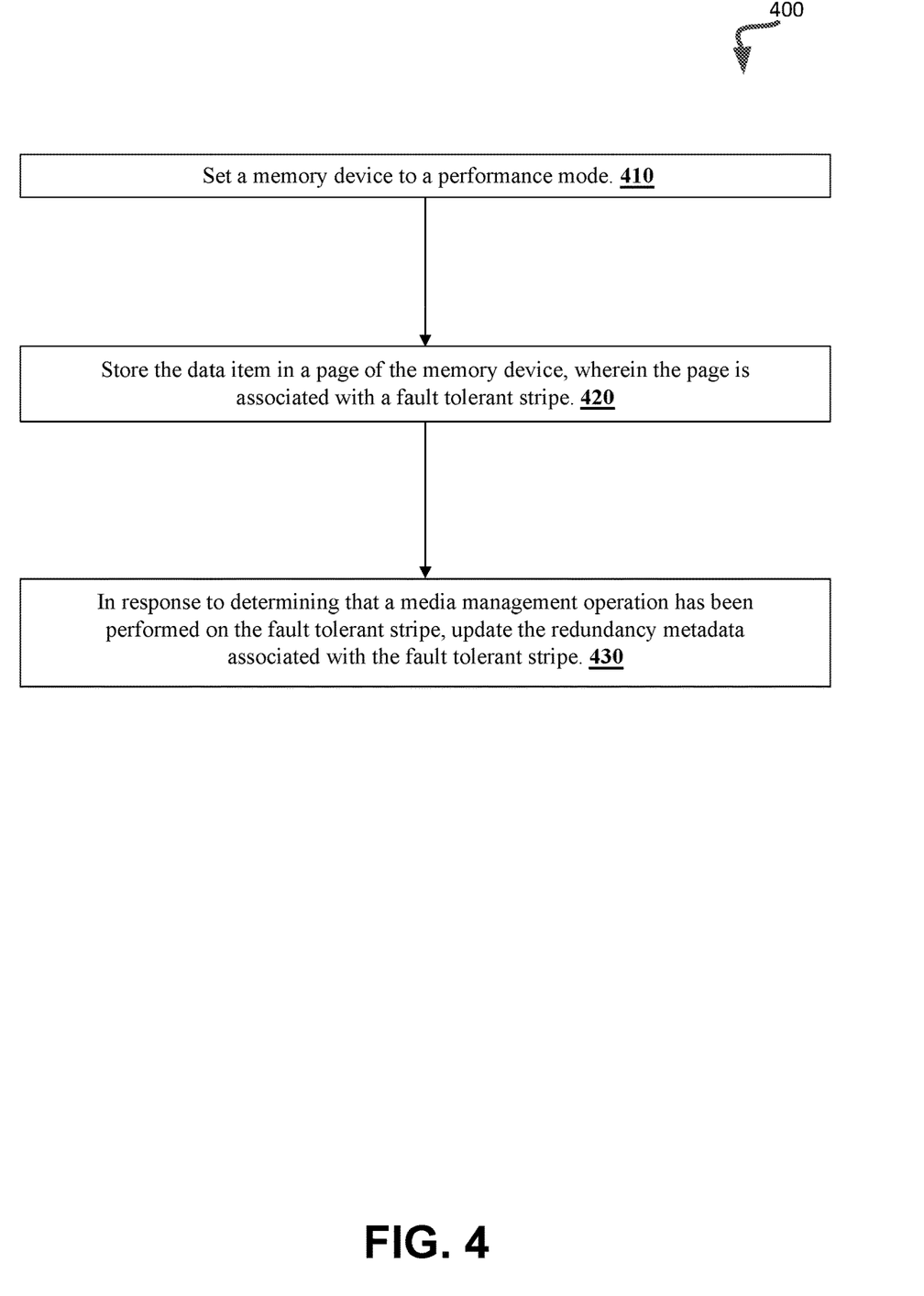
FIG. 4 is a flow diagram of another example method of performing media write operations in accordance with some embodiments of the present disclosure.

FIG. 4 is a flow diagram of another example method 400 of performing media write operations, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media write component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic sets, based on a performance mode being the chosen mode of operation, a memory device to a performance mode. Once in performance mode, at operation 420, the processing logic stores the data item in a page of the memory device, wherein the page is associated with a fault tolerant stripe. The data item is stored in the page of the memory device and a redundancy metadata update is delayed for a fault tolerant stripe until a media management operation is performed. As describe previously, data item is constantly being written to the memory device. During those write operation, redundancy metadata (e.g., XOR parity) is not updated for the fault tolerant stripe until a media management operation is performed. As described previously, management operation which can be a write scrub operation or wear leveling operation that is periodically performed every predetermined time period (e.g., every 3 hours). The predetermined time period that the media management operation is to be performed is based on the when the previous media management operation that was performed.

At operation 430, the processing logic in response to determining that a media management operation has been performed on the fault tolerant stripe, update the redundancy metadata associated with the fault tolerant stripe. As described previously, the media management operation performed in the background at the predetermined time period, (e.g., 3 hours from the previous media management operation) the redundancy metadata (e.g., XOR parity) associated with each of the fault tolerant stripes are calculated and stored in the redundancy metadata of the fault tolerant stripe.

Figure 5:
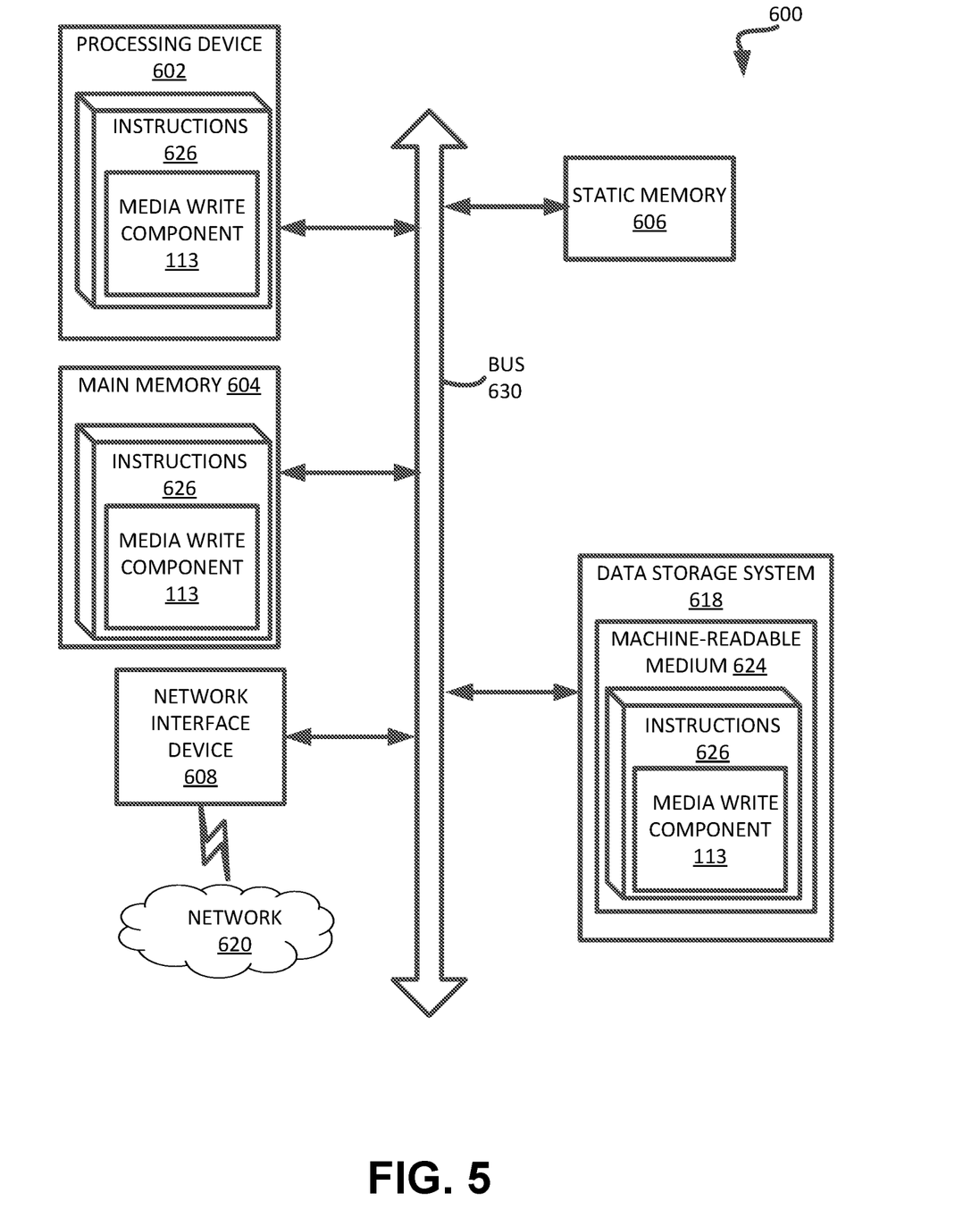
FIG. 5 is a block diagram of an example computer system in which embodiments of the present disclosure may operate.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media write component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a performance component (e.g., the media write component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
   setting the memory device to a performance mode;
   receiving a data item;
   storing the data item in a page of the memory device, wherein the page is associated with a fault tolerant stripe comprising a redundancy metadata and a flag;
   responsive to performing a write operation to data units of the fault tolerant stripe, clearing the flag thus indicating that the redundancy metadata of the fault tolerant stripe has not been updated following the write operation; and
   responsive to performing a media management operation on the fault tolerant stripe, setting the flag thus indicating that the redundancy metadata of the fault tolerant stripe has been updated following the media management operation to reflect a latest write operation.

2. The system of claim 1, wherein the operations further comprises:
   responsive to performing the media management operation on the fault tolerant stripe, updating the redundancy metadata of the fault tolerant stripe.

3. The system of claim 2, wherein updating the redundancy metadata of the fault tolerant stripe comprises:
   determining redundancy metadata associated with the fault tolerant stripe; and
   storing, on the memory device, the redundancy metadata associated with the fault tolerant stripe.

4. The system of claim 1, wherein the redundancy metadata is an XOR parity of the fault tolerant stripe.

5. The system of claim 1, wherein the media management operation is one of a write scrub operation or a wear leveling operation.

6. The system of claim 1, wherein the media management operation is periodically performed at a predetermined time period.

7. The system of claim 1, wherein the operations further comprise:
   responsive to setting the flag of each fault tolerant stripe of the memory device, setting a valid flag associated with the memory device; and
   responsive to clearing the flag of at least one fault tolerant stripe of the memory device, clearing the valid flag associated with the memory device.

8. A method, comprising:
   setting, by a processing device, a memory device to a performance mode;
   receiving a data item;
   storing the data item in a page of the memory device, wherein the page is associated with a fault tolerant stripe comprising a redundancy metadata and a flag;
   responsive to performing a write operation to data units of the fault tolerant stripe, clearing the flag thus indicating that the redundancy metadata of the fault tolerant stripe has not been updated following the write operation; and
   responsive to performing a media management operation on the fault tolerant stripe, setting the flag thus indicating that the redundancy metadata of the fault tolerant stripe has been updated following the media management operation to reflect a latest write operation.

9. The method of claim 8, further comprising:
   responsive to performing the media management operation on the fault tolerant stripe, updating the redundancy metadata of the fault tolerant stripe.

10. The method of claim 9, wherein updating the redundancy metadata of the fault tolerant stripe comprises:
    determining redundancy metadata associated with the fault tolerant stripe; and
    storing, on the memory device, the redundancy metadata associated with the fault tolerant stripe.

11. The method of claim 8, wherein the redundancy metadata is an XOR parity of the fault tolerant stripe.

12. The method of claim 8, wherein the media management operation is one of a write scrub operation or a wear leveling operation.

13. The method of claim 8, wherein the media management operation is periodically performed at a predetermined time period.

14. The method of claim 8, further comprising:
    responsive to setting the flag of each fault tolerant stripe of the memory device, setting a valid flag associated with the memory device; and
    responsive to clearing the flag of at least one fault tolerant stripe of the memory device, clearing the valid flag associated with the memory device.

15. A non-transitory computer-readable storage medium comprising instructions that, when executed by a processing device, cause the processing device to perform operations comprising:

setting a memory device to a performance mode;

storing a data item in a page of the memory device, wherein the page is associated with a fault tolerant stripe comprising a redundancy metadata and a flag; and responsive to performing a media management operation on the fault tolerant stripe, setting the flag thus indicating that the fault tolerant stripe has been updated following the media management operation.

16. The non-transitory computer-readable storage medium of 15, wherein the media management operation is one of a write scrub operation or a wear leveling operation.

17. The non-transitory computer-readable storage medium of 15, wherein the media management operation is periodically performed at a predetermined time period.

18. The non-transitory computer-readable storage medium of 15, wherein the redundancy metadata is an XOR parity of the fault tolerant stripe.

19. The non-transitory computer-readable storage medium of 15, wherein the processing device is to further perform operations comprising:

responsive to performing a write operation to data units of the fault tolerant stripe, clearing the flag thus indicating that the redundancy metadata of the fault tolerant stripe has not been updated following the write operation to reflect the write operation.

20. The non-transitory computer-readable storage medium of 15, wherein the processing device is to further perform operations comprising:

responsive to performing the media management operation on the fault tolerant stripe, updating the redundancy metadata of the fault tolerant stripe.

* * * * *